UNITED STATES PATENT OFFICE.

FRITZ SINGER, OF OFFENBACH-ON-THE-MAIN, GERMANY, ASSIGNOR TO CORPORATION OF CHEMISCHE FABRIK GRIESHEIM-ELEKTRON, OF FRANKFORT-ON-THE-MAIN, GERMANY.

PROCESS OF MAKING ALIZARIN.

1,150,152.  Specification of Letters Patent.  Patented Aug. 17, 1915.

No Drawing.   Application filed July 23, 1914.  Serial No. 852,631.

*To all whom it may concern:*

Be it known that I, FRITZ SINGER, citizen of the German Empire, and resident of Offenbach-on-the-Main, in the Grand Duchy of Hesse, Germany, have invented new and useful Improvements in Processes of Making Alizarin, of which the following is a specification.

My invention relates to a process of making alizarin consisting in heating with an alkali the meso-nitro-derivatives, of anthracene, which may be obtained for instance by treating anthracene with nitric acid or nitrogen peroxid.

The formation of alizarin already takes place without an addition of an oxidizing agent, because the nitro-groups are reduced to ammonia in the alkali melt. The addition of an oxidizing agent to the melt is advantageous for obtaining best possible yields of alizarin. The addition of sodium sulfite and caustic lime acts very favorably upon the reaction.

The process is industrially very important, since it allows of the production of alizarin from commercial anthracene, with use of an easily obtainable intermediate product. In this manner the troublesome preparation and purification of anthraquinone and anthraquinonesulfonic acids may be avoided. Advantageously also mixtures of meso-nitro-derivatives may be used. For instance, the mixture of 9.10-trinitro-9.10-dihydroanthracene, the structural formula of which may be stated as follows:

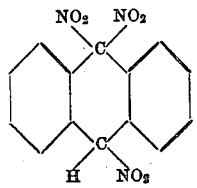

and of 9 nitro-10-keto-9.10-dihydroanthracene, the structural formula of which may be stated as follows:

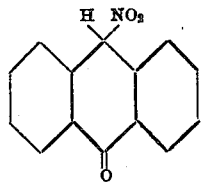

obtainable, according to Meisenheimer (*Annalen der Chemie*, vol. 330, page 163) by action of an excess of nitric acid upon anthracene suspended in acetic acid, is excellently suitable for the production of alizarin according to the present process.

The following examples illustrate the invention, the parts being by weight:—

Example I: 50 parts of 9.10-dinitro-anthracene, the structural formula of which may be stated as follows:

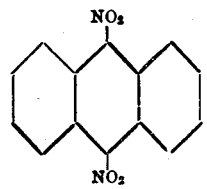

finely ground with 100 parts of water, 167 parts of caustic soda, 80 parts of a solution of sodium bisulfite neutralized with 35 parts of caustic soda lye of 35° Baumé, 60 parts of caustic lime, 20.6 parts of sodium nitrate and 626 parts of water are together heated at 200° C. for 2–3 days in an iron-autoclave, provided with a stirrer. The beautiful brownish-red lime-lake of alizarin thus obtained, is filtered and decomposed with hydrochloric acid; the alizarin thus formed is filtered, washed and dissolved in dilute caustic soda lye; the alkaline solution is treated with air for the purpose of transforming small quantities of diluted 9.10-dioxy-9.10-dihydroanthracene into insoluble anthraquinone and filtered. By mixing the filtered alkaline solution with diluted sulfuric or hydrochloric acid alizarin is precipitated in a very pure form of orange tint.

Example II: 40 parts of 9 nitro-10-keto-9.10-dihydroanthracene, the structural formula of which may be stated as follows:

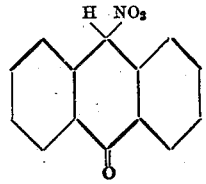

134 parts of caustic soda, 16,5 parts of sodium nitrate, 32 parts of caustic lime, 64 parts of sodium bisulfite lye, neutralized with 28 parts of caustic soda lye of 35° Baumé, and 581 parts of water are together heated at 200° for 50 hours and worked up, as described in Example I.

Example III: 35 parts of nitrate of 9- nitro - 10 - oxy-9.10-dihydroanthracene, the structural formula of which may be stated as follows:

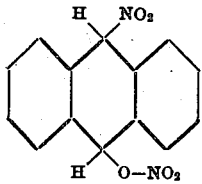

obtainable according to Meisenheimer (*Annalen der Chemie*, vol. 330 page 160), 175 parts of caustic soda, 84 parts of a solution of sodium bisulfite neutralized with 36.8 parts of caustic soda lye of 35° Baumé, 28 parts of caustic lime, 14.4 parts of sodium nitrate and 762 parts of water are together heated at 200° C. for 50 hours and worked up as described is Example I.

Now what I claim and desire to secure by Letters Patent is the following:

1. The process of making alizarin, consisting in heating meso-nitro derivatives of anthracene with an alkali substantially as described.

2. The process of making alizarin, consisting in heating meso-nitro derivatives of anthracene with an alkali in the presence of an oxidizing agent, substantially as described.

3. The process of making alizarin, consisting in heating meso-nitro derivatives of anthracene with an alkali after addition of an oxidizing agent and in presence of a sulfite and of caustic lime, substantially as described.

That I claim the foregoing as my invention I have signed my name in presence of two witnesses, this eighth day of July, 1914.

FRITZ SINGER.

Witnesses:
PETER LAUTENSCHLÄGER,
FRITZ DÉSOE.